Aug. 6, 1940.   J. W. KRIPLEAN   2,210,813
ROLLING COLTER
Filed Jan. 24, 1940   2 Sheets-Sheet 1

Inventor
J. W. Kriplean

Aug. 6, 1940.  J. W. KRIPLEAN  2,210,813
ROLLING COLTER
Filed Jan. 24, 1940  2 Sheets-Sheet 2
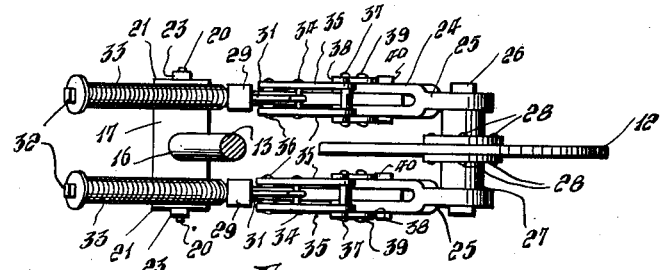
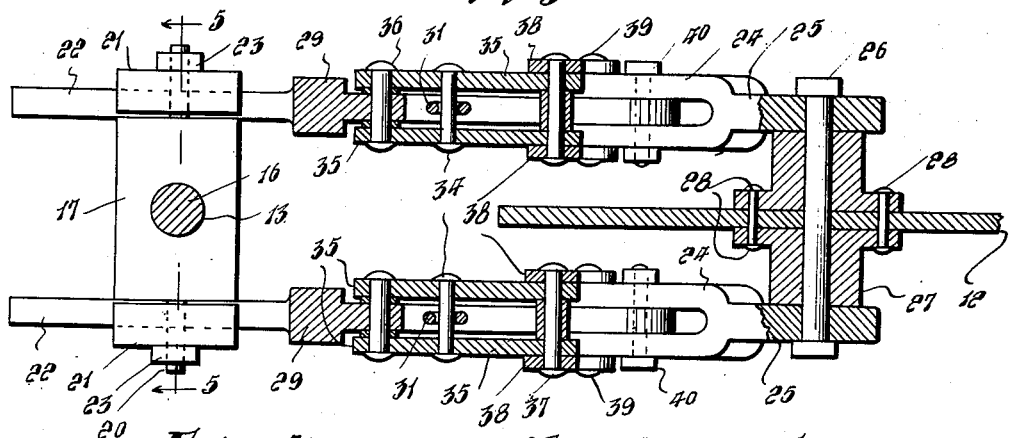
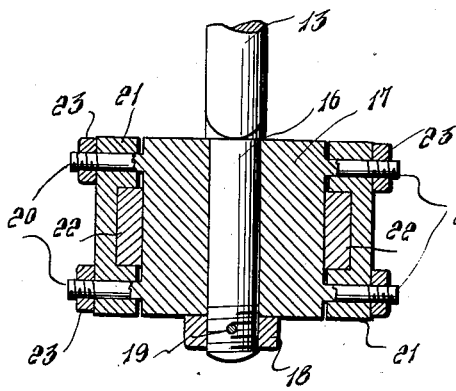
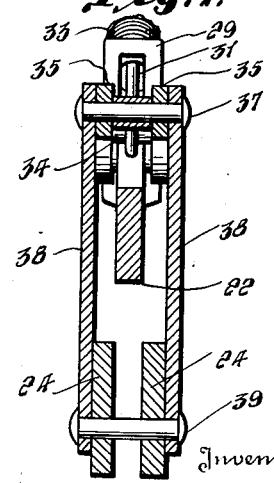
Inventor
J. W. Kriplean
Attorney Patented Aug. 6, 1940

2,210,813

UNITED STATES PATENT OFFICE 2,210,813

ROLLING COLTER

John W. Kriplean, Medford, Wis.

Application January 24, 1940, Serial No. 315,425

3 Claims. (Cl. 97—209)

This invention relates to a knee action rolling colter for plows.

It is aimed to provide a novel construction which may be built as an attachment or addition to a plow, and especially a construction wherein the colter will yield automatically upon striking a stone or obstruction, permitting continuation of the plowing action and automatic return of the colter to normal position after the stone or obstruction is passed, thereby avoiding breakage of the colter or other part of the equipment.

The more specific objects and advantages will become apparent from a consideration of the description following taken in connection with accompanying drawings illustrating an operative embodiment.

In said drawings:

Figure 3 is a horizontal section taken on the plane of line 3—3 of Figure 1; and Figure 4 is a horizontal section taken on the plane of line 4—4 of Figure 1;

Figure 5 is a vertical section taken on the plane of line 5—5 of Figure 4;

Figure 6 is a vertical section taken on the plane of line 6—6 of Figure 1, and

Figure 7 is a vertical section taken on the plane of line 7—7 of Figure 1.

Figure 1:
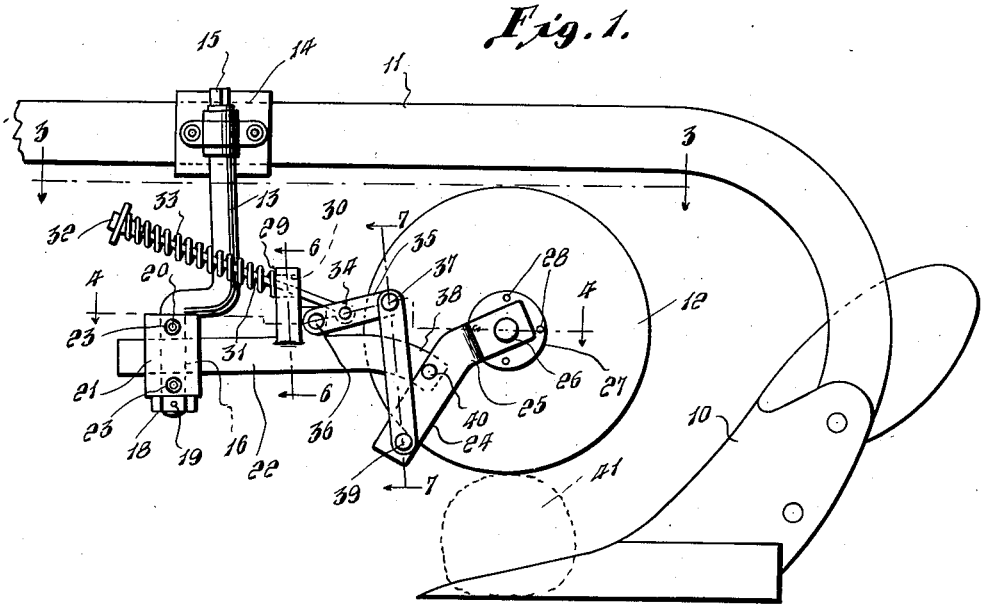
Figure 1 is a view in side elevation showing a plow equipped with my improved colter construction, the same being shown elevated or displaced through engagement with a rock or obstruction.

Referring specifically to the drawings wherein like reference characters designate like or similar parts, 10 designates a conventional plow which is attached to and adapted to be drawn by a beam 11, for instance drawn by a tractor or otherwise.

In accordance with the invention, a colter is provided at 12 in the form of a roller which is adapted to travel on the ground adjacent the front end of the plow, being yieldably supported as hereinafter described, from the beam 11.

A depending shank 13 is clamped or otherwise removably and adjustably fastened to the beam 11 as at 14, the upper end of the shank preferably having a polygonal head 15 for engagement by a wrench in order to turn the shank. At the lower end, shank 13 has an offset portion or extremity 16 to which a bracket or block 17 is fastened by means of a nut 18 and a pin 19.

Said bracket 17 at opposite sides has laterally extending studs 20 detachably mounting plates 21 which are fitted about and adjustably secure in place, a pair of side bars 22. Nuts 23 are applied to the studs 20 to clamp the plates 21 against the side bars 22 and the latter rigidly against the bracket 17. The rear ends of the side bars 22 extend into bifurcated portions 24 of hangers or levers 25 in which a bolt or axle 26 is journaled. Such axle 26 passes through the colter 12 and also through hub members 27 which are riveted or fastened as at 28 together and to the colter wheel. Such colter wheel 12 and hub members 27 are journaled on the axle 26.

Saddles 29 rise integrally from the side bars 22 and they have relatively large guide openings 30 therethrough through which rods 31 pass and which rods have heads 32 thereon at their forward ends. Coil springs 33 surround the rods 31, abutting the saddles 29 and the heads 32, being either at rest or under slight tension as preferred.

At the rear ends, such rods 31 are pivotally connected at 34 to levers or straps 35 which are pivoted at one end as at 36 to the side bars 22 and at the other end as at 37 to depending links 38 whose lower ends are pivoted at 39 to the bifurcated portions 24 of hangers 25, the latter being pivoted as at 40 to the forward ends of the side bars.

Figure 2:
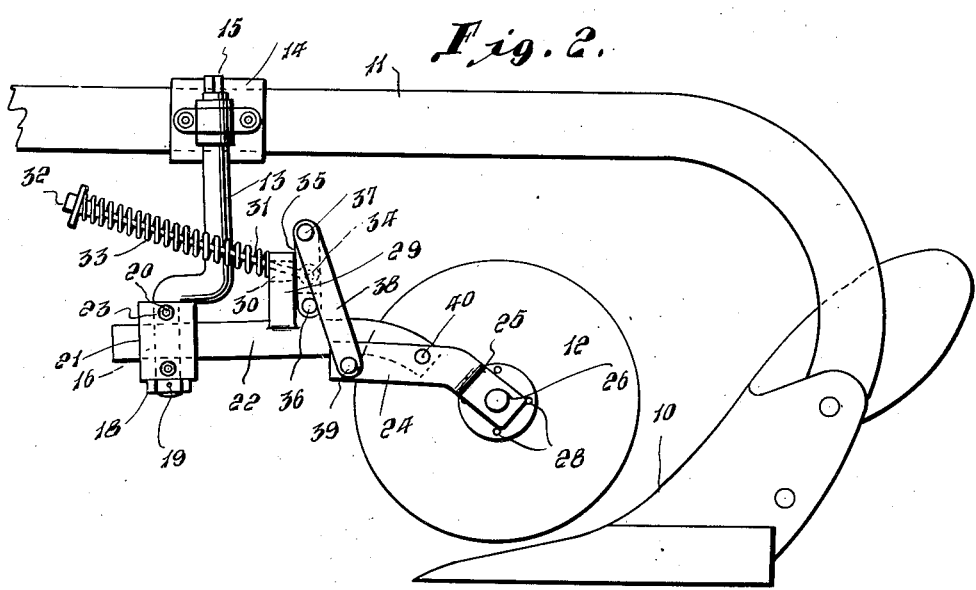
Figure 2 is a view similar to Figure 1 but with the parts in position for normal operation.

The parts are shown in normal position in Figure 2 with the colter wheel 12 positioned to travel on the surface of the ground, being so positioned and cushioned through the medium of the springs 33 and associated parts. However, should the colter wheel strike a rock or obstruction in its path of travel as suggested at 41 in Figure 1, the colter 12 will be raised by such obstruction 41 thereby swinging the hangers 25 on the pivots 40, pulling the links 38 downwardly as well as the straps 35 downwardly from the pivots 36, drawing on the rods 31 and compressing or tensioning the springs 33. Plowing however will continue but when the colter rides over the obstruction 41, the springs 33 will expand and restore the parts from the position of Figure 1 to the position of Figure 2 automatically.

It will be clear that through the rotation of the shank 13 by engagement of a tool with the head 15 or the like, that the colter and associated parts may be disposed in any desired position laterally with respect to the plow 10 and its beam 11.

Various changes may be resorted to provided they fall within the spirit and scope of the invention.

I claim as my invention:

1. A colter construction comprising side beams, means to mount said side beams on a plow, a colter wheel, means mounting said wheel pivoted to the side bars, pivoted elements connected to said last mentioned means and side beams, a link pivoted to one of said elements, a strap pivoted to said link and one of said side beams and spring means arranged so as to be tensioned through movement of the colter away from the ground upon encountering an obstruction, said spring means having a rod attached to the strap and slidably connected to one of said beams.

2. A colter construction comprising side beams, means to mount said side beams on a plow, a colter wheel, means mounting said wheel pivoted to the side beams, pivoted elements connected to said last mentioned means and side beams, spring means connected to one of the pivoted elements so as to be tensioned through movement of the colter away from the ground upon encountering an obstruction, said spring means including a rod, and a guide on one of the side beams through which the rod passes.

3. A colter construction comprising side beams, means to mount said side beams on a plow, a colter wheel, means mounting said wheel pivoted to the side bars, pivoted elements connected to said last mentioned means and side bars, spring means connected to one of the pivoted elements so as to be tensioned through movement of the colter away from the ground upon encountering an obstruction, the first mentioned means including a bracket, studs extending laterally from the bracket, and clamping plates mounted by said studs and fitted about the side bars to clamp the latter against the bracket.

JOHN W. KRIPLEAN.